United States Patent [19]
Scraver et al.

[11] Patent Number: 6,019,413
[45] Date of Patent: Feb. 1, 2000

[54] ROTATING STORAGE SEAT

[75] Inventors: Robert B. Scraver, Holland; David B. Busch, Holland; Chester R. Wisniewski, Holland; Neil J. Bush, Pinckney; Nick G. Xiromeritis, Holland; David J. McCarthy, Holland, all of Mich.

[73] Assignee: Prince Corporation, Holland, Mich.

[21] Appl. No.: 09/132,135

[22] Filed: Aug. 10, 1998

Related U.S. Application Data

[63] Continuation-in-part of application No. 08/999,221, Dec. 29, 1997.

[51] Int. Cl.[7] .................................................. B60N 2/36
[52] U.S. Cl. ......................... 296/66; 296/65.05; 297/3; 297/15; 297/335
[58] Field of Search .......................... 296/65.05, 65.09, 296/66, 69; 297/1–3, 15, 326, 335

[56] References Cited

U.S. PATENT DOCUMENTS

| | | |
|---|---|---|
| Re. 6,561 | 7/1975 | Cahill . |
| 173,774 | 2/1876 | Dennett . |
| 914,334 | 3/1909 | Buff . |
| 1,203,831 | 11/1916 | Wittman . |
| 1,887,947 | 11/1932 | Savale . |
| 1,894,103 | 1/1933 | Kuenzel . |
| 2,956,837 | 10/1960 | Koplin . |
| 3,806,183 | 4/1974 | Sieren et al. . |
| 4,869,541 | 9/1989 | Wainwright . |
| 5,064,246 | 11/1991 | Pipon et al. . |
| 5,230,523 | 7/1993 | Wilhelm . |
| 5,269,581 | 12/1993 | Odagaki et al. . |
| 5,492,386 | 2/1996 | Callum . |
| 5,535,931 | 7/1996 | Barlow et al. . |
| 5,690,381 | 11/1997 | Hasegawa et al. . |
| 5,868,451 | 2/1999 | Uno et al. ............................. 296/65.05 |

FOREIGN PATENT DOCUMENTS

| | | | |
|---|---|---|---|
| 22801 | 2/1918 | Denmark ................................. | 296/66 |
| 1096280 | 6/1955 | France . | |

*Primary Examiner*—Dennis H. Pedder
*Attorney, Agent, or Firm*—Price, Heneveld, Cooper, DeWitt & Litton

[57] ABSTRACT

A seating/storage system includes a seat which is rotatably supported on opposite ends between the sidewalls of a vehicle on a pivot axle in spaced relationship above the floor level of the vehicle. The seat pivot axle, in turn, is mounted to a rotating member offset from the pivot axle such that, when rotated to a seating position, the seat is positioned above the floor level and, when rotated to a storage position, the seat is positioned in a recess with the lower side of the seat defining the floor of the vehicle. A releasable latching member extends between the rotatable member and the vehicle seat to selectively lock the seat in use or stored positions. In a preferred embodiment, a releasable latch also extends between a fixed seat frame and the rotatable member to selectively lock the seat back and seat in use or stored positions.

18 Claims, 3 Drawing Sheets

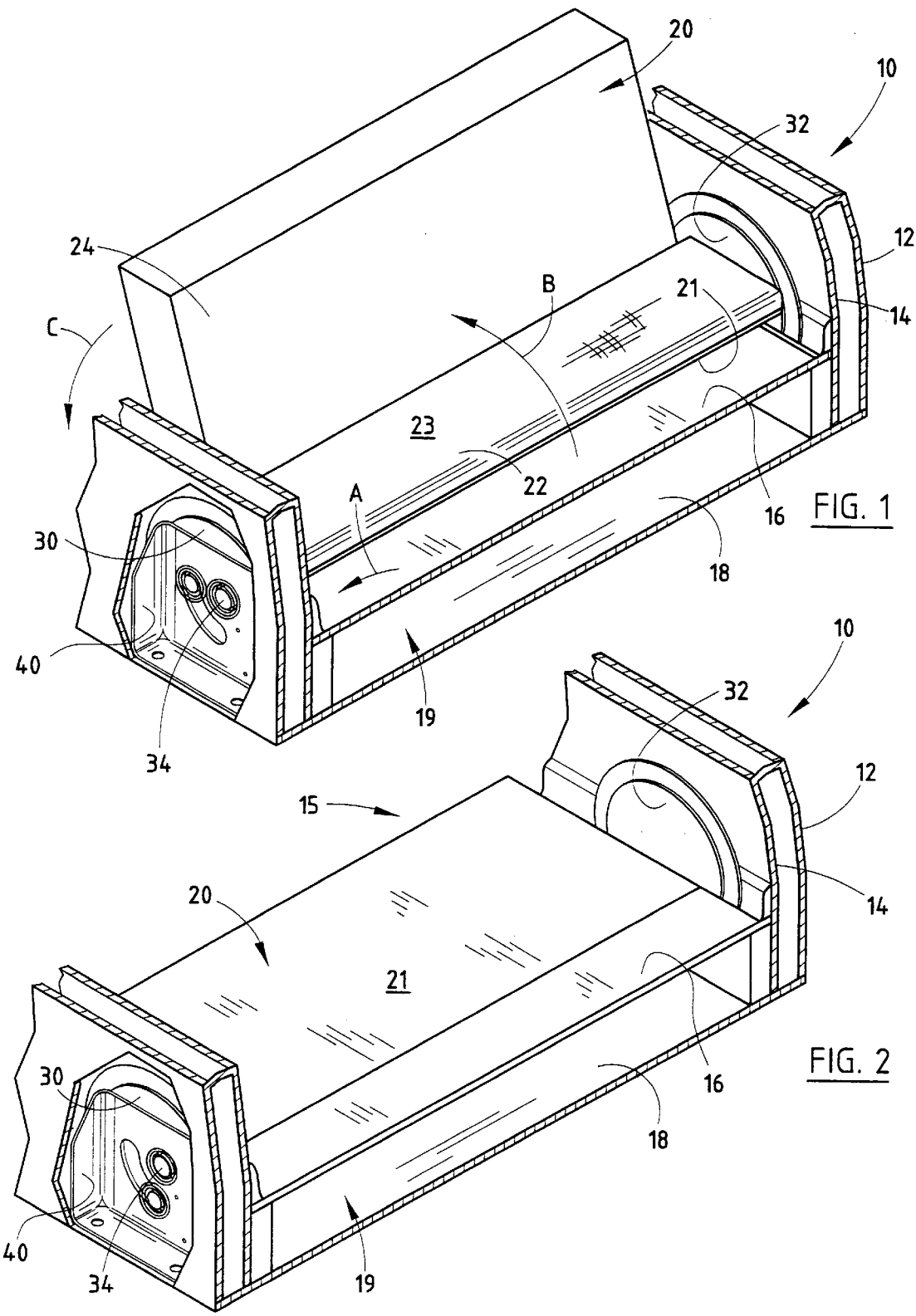

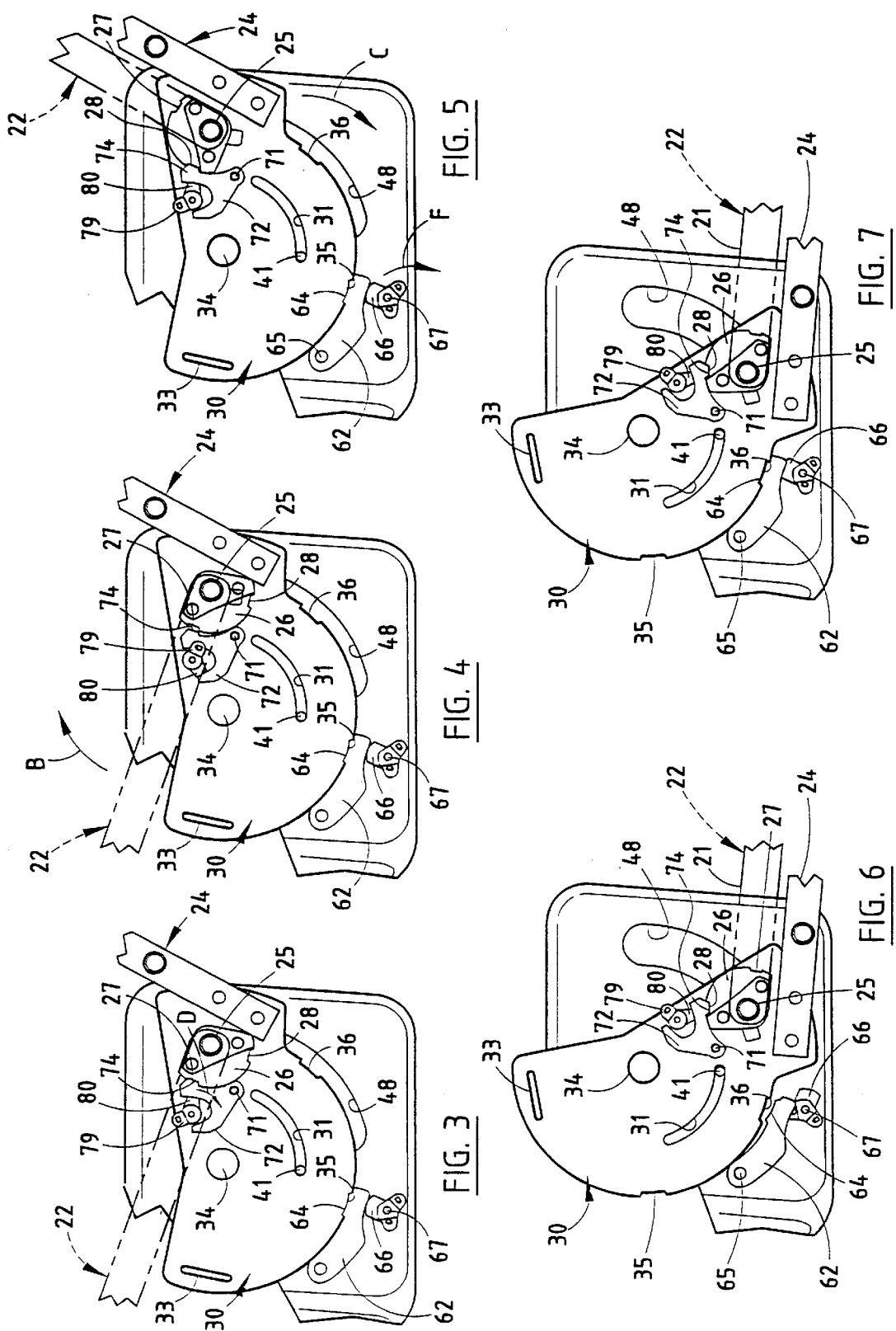

ROTATING STORAGE SEAT

CROSS REFERENCE TO RELATED APPLICATION

This application is a continuation-in-part application of U.S. patent application Ser. No. 08/999,221, filed Dec. 29, 1997, entitled ROTATING SEAT/STORAGE UNIT, the disclosure of which is incorporated herein by reference.

BACKGROUND OF THE INVENTION

The present invention relates to a vehicle seat and storage unit and particularly one which rotates between storage and use positions.

There exists a variety of seating arrangements by which seats can be folded from a use position in a vehicle to a flat position, providing a flat storage area for the vehicle. In most of these seating arrangements, such as in vans and utility vehicles such as a General Motors Suburban, when the seat is folded into a flat position to provide storage, the resultant flat surface is elevated above the foot rest floor level of the vehicle, thereby reducing the available storage volume. Other such seating arrangements, although providing folding seats which store into recesses within the body of the vehicle, have not utilized the seats to also define segregated storage areas when positioned in intermediate positions. Still further, the foldable seats of the prior art typically require a variety of connection links, pivot rods, feet and other structure for control of their folding and storage and, as a result, when in a use position for seating, the space under the seat is not available for additional storage.

As a result, there remains a need for a seating system in which a seat can be moved from a use position to a stored position or intermediate positions without removing the seat from the vehicle and which is easy to tumble out of the way to define a flexible seating arrangement with maximum storage and seating capacity. Also, there exists a need for a releasable latching mechanism to allow the vehicle operator or passenger to easily release the seat back and seat for movement between stored and use positions and selectively lock the seat back and seat in such positions.

SUMMARY OF THE PRESENT INVENTION

The seating/storage system of the present invention satisfies this need by providing a seat which is rotatably supported on opposite ends between the sidewalls of a vehicle on a pivot axle in spaced relationship above the floor level of the vehicle. The seat pivot axle, in turn, is mounted to a rotating member offset from the pivot axle such that, when rotated to a seating position, a seating platform is positioned above the floor level and, when rotated to a storage position, the seating platform is positioned in a recess with the lower side of the seating surface defining the floor of the vehicle.

In a preferred embodiment of the invention, a releasable latching member extends between the rotatable member and the vehicle seat to selectively lock the seat in use or stored positions. In a preferred embodiment also, a releasable latching member extends between a fixed seat frame and the rotatable member to selectively lock the seat back and seat in use or stored positions. The seat, thus, rotates between a seat use position and a position adjacent the seat back for storage. Subsequently, the seat and seat back can be simultaneously rotated to a storage position. As a result of this construction, the seat not only provides a floor which is substantially flush with the remaining floor area of the vehicle when stored, but a seat which, when in a seating position, is open under the seating area for additional storage under the seat. The latching mechanism allows for the easy manipulation of the seat and seat back and preferably includes spring-loaded pivoted locking dogs which can be cable operated.

These and other features, objects and advantages of the present invention will become apparent upon reading the following description thereof together with reference to the accompanying drawings.

BRIEF DESCRIPTION OF THE DRAWINGS

FIG. 1 is a fragmentary perspective view, partly broken away, of a vehicle and seat constructed in accordance with the present invention, shown in a use or seating position;

FIG. 2 is a fragmentary perspective view of the vehicle seat according to the present invention, showing the seat in a stored position;

FIG. 3 is an inside end elevational view of the right end of the seat control mechanism taken in the direction of arrow A in FIG. 1, showing the seat latched in the position illustrated in FIG. 1;

FIG. 4 is an inside end elevational view of the right end of the seat control mechanism taken in the direction of arrow A in FIG. 1, showing the seat unlatched and ready for movement between the use position shown in FIG. 1 to an intermediate stored position;

FIG. 5 is an inside end elevational view of the right end of the seat control mechanism taken in the direction of arrow A in FIG. 1, showing the seat latched in a raised position adjacent the seat back;

FIG. 6 is an inside end elevational view of the right end of the seat control mechanism taken in the direction of arrow A in FIG. 1, showing the seat and seat back in the lowered stored position showing the latch released;

FIG. 7 is an inside end elevational view of the right end of the seat control mechanism taken in the direction of arrow A in FIG. 1, showing the seat and seat back latched in the stored position illustrated in FIG. 2;

DETAILED DESCRIPTION OF THE PREFERRED EMBODIMENT

Figure 8:
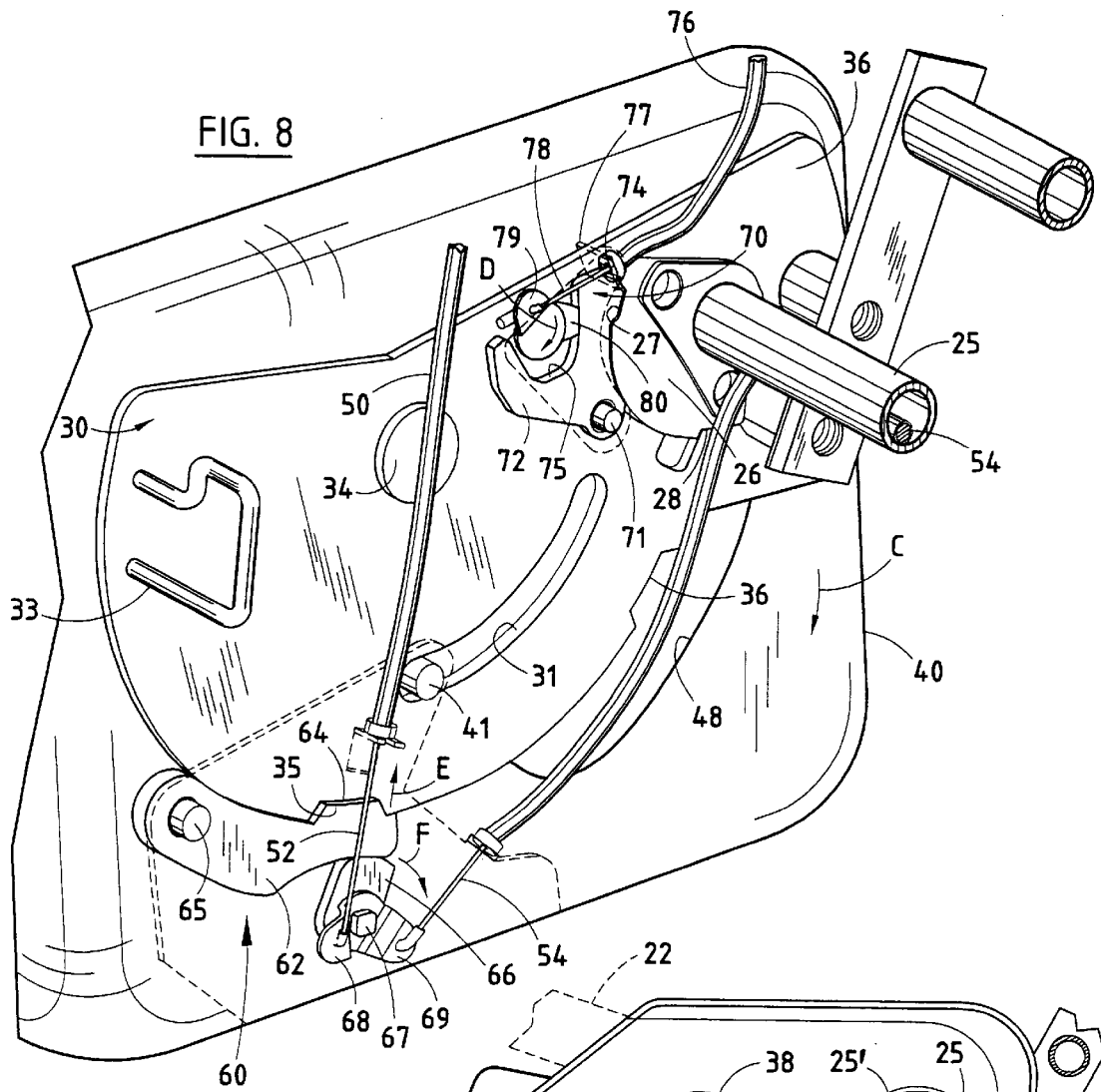
FIG. 8 is an enlarged detailed fragmentary perspective view of the releasable locking mechanism shown in FIGS. 3–7.

Referring initially to FIGS. 1 and 2, there is shown in broken-away form the rear storage area of a vehicle 10, such as a mini van, sport utility vehicle or other vehicle having a rear storage area. The vehicle includes an outer sheet metal skin 12, an inner skin 14 typically covered with upholstery material and a floor 16 which forms the footrest area of the vehicle. The vehicle typically will have a rear tailgate which pivots downwardly from the vehicle in a conventional manner to allow access to the storage area 15 provided when the seat assembly 20 of the present invention is in its lowered stored position, as seen in FIG. 2. The vehicle chassis also includes an underlying pan 18 which is mounted to the frame of the vehicle in a conventional manner and which defines a recessed storage area 19 under the floor 16 and seat assembly 20 of the present invention and which may be accessible from the rear of the seat assembly 20.

Figure 9:
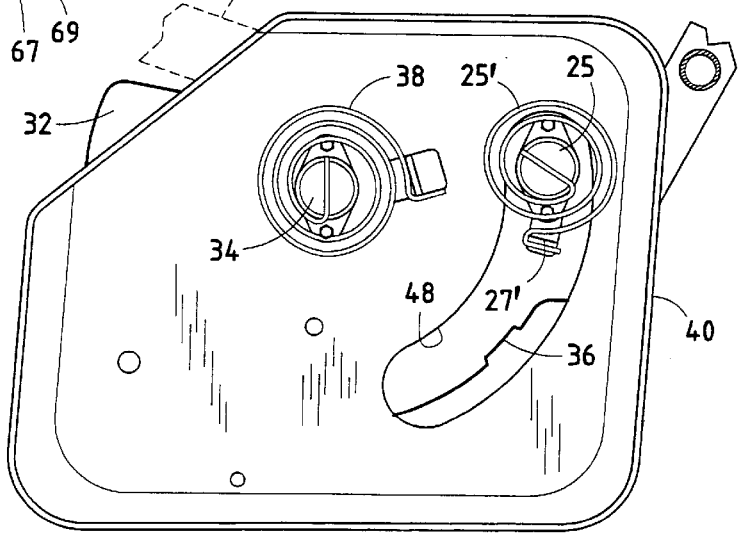
FIG. 9 is a fragmentary end elevational view of the outside of the opposite end of the seat.

The seat assembly 20 of the present invention comprises a generally horizontally extending seat 22 and a seat back 24 both of which are mounted to disk-like rotatable support members 30 and 32, with member 30 being positioned on the right side of the vehicle and member 32 being positioned on the left side of the vehicle. The rotatable disk-shaped members are, as best seen in FIGS. 8 and 9, rotatably mounted to a fixed seat frame member 40 fixedly mounted to the vehicle chassis in a conventional manner and to which the disk-shaped rotatable members are rotatably mounted by means of an axle 34. As will be described in greater detail below, the seat back 24 is fixedly mounted to each of the rotatable members 30, 32, while the seat 22 is rotatably mounted thereto such that seat 22 can move upwardly adjacent the seat back 24 in a direction indicated by arrow B in FIGS. 1 and 4 to an intermediate stored position as seen in FIG. 5. Subsequently the seat and seat back are pivoted downwardly together in the direction indicated by arrow C in FIGS. 1 and 5 such that the undersurface 21 of seat 22 fills in and becomes the support floor for a storage area 15 (FIG. 2) and is substantially flush with the remaining floor surface 16 of the vehicle.

The seat 22 includes a tubular frame (not shown) welded to axle 25 (FIG. 8) and padded upholstered surface 23 defining the seating area of seat assembly 20. The frame of the seat extends from the seat pivot axle 25 (FIGS. 3–9), which is pivotally mounted to rotatable members 30, 32 and in particular to a rearwardly extending tang 36 of each rotatable member 30, 32. A releasable latching assembly 70 (described in greater detail below) releasably holds the pivot axle 25 and seat 22 in fixed relationship to the rotatable members 30, 32 and can be released to allow the seat to move from the position shown in FIG. 1 to the position shown in FIGS. 2 and 5–7 adjacent the seat back for storage. The rotatable members 30, 32 are, in turn, selectively locked in the use position shown in FIGS. 1, 2–5, 8 and 9 by the releasable locking mechanism 60, also described in greater detail below.

The rotatable members 30, 32 are generally disk-shaped with a thickness sufficient to support the seat 22. Each of the members 30, 32 include an arcuate slot 31 through which a guide pin 41 extending from the fixed frame member 40 extends to provide guided support for the rotatable members 30, 32 as they rotate between use and stored positions. The length of slot 31 is selected to be approximately 75° to allow the assembly to move from the position shown in FIGS. 5 and 8 to the lowered stored position, as seen in FIGS. 2, 6 and 7. Facing inwardly from the forward edge of each of the rotatable members 30, 32 is a striker bar 33 which receives and lockably supports the forward edge of seat 22 when in its lowered use position, as seen in FIG. 1. A conventional spring-loaded latch may be provided to releasably engage the strikers 33 for allowing the seat to rotate from a position shown in FIGS. 1, 3 and 4 to the position shown in FIG. 5.

Fixedly mounted to the opposite ends of the pivot axle 25 of seat 22 is a locking plate 26 having a generally arcuate outer surface with a pair of spaced-apart locking notches 27, 28 corresponding to the use and stored positions of the seat, respectively. The releasable locking mechanism 70 for the seat back includes a somewhat U-shaped pivoted locking dog 72 having a first leg extension 74 which selectively extends within slots 27, 28. Locking dog 72 is pivotally mounted to rotatable member 30 by means of a pivot pin 71. A control cable 76 is fixedly mounted to rotatable member 30 by means of a bracket 77 and includes an inner movable cable 78, which is coupled to a pivotally mounted release cam 79 having a tang 80 which selectively engages the edge 75 of a U-shaped slot formed in locking dog 72 to lock the end 74 of dog 72 in either recess 27 or 28 of cam 26 for positively locking the seat in either a lowered use position or a raised stored position. Cable 76 extends into the interior of the vehicle and terminates either in a hand-operated handle or a push-button solenoid operated control for selectively rotating member 79 in a direction indicated by arrow D (FIGS. 3, 4 and 8) for moving the locking tang 80 and end 74 of locking dog 72 away from pivot axle cam plate 26 releasing the seat for rotating or for selectively moving the dog 72 into a positive locking position, as illustrated in FIGS. 3, 5 and 8. To assist the movement of seat 22, a coil spring 25' (FIG. 9) extends between the end of pivot axles 25 of the seat on each side and has an end which is fixedly mounted to a tang 27' on plates 30, 32 for urging the seat to a raised position illustrated in FIG. 5. Thus, when cable 76 is released, the seat can easily be moved to a raised position for storage. If necessary, a similar locking mechanism can be provided for the opposite side of the seat, in which case a single switch can actuate the two solenoids preferably employed to control release cable 76. The locking assembly 60 for the rotatable members 30, 32, which provide for the gross simultaneous movement of the seat and seat back between the intermediate position (shown in FIG. 5) and the stored position (shown in FIGS. 2, 6 and 7) is now described.

The locking assembly 60 comprises a pivoted dog 62 having a locking end 64 remote from a pivot pin 65 extending from frame 40 through the locking dog 62. The dog 62 is selectively held in a locking position by means of a cam 66 which is pivotally mounted by pivot axle 67 to frame 40 and controlled by a cable 50 having an inner cable 52 coupled to a first end 68 (FIG. 8) of a rotatable flange coupled to cam 66. The flange includes an opposite end 69, which is coupled to a cross-talk cable 54, which extends through the hollow pivot axle 25 of the seat to a similar releasable locking assembly associated with the left side of the seat assembly 20. When cable 52 is released, i.e., moved in the direction indicated by arrow E in FIG. 8, cam 66 moves in a clockwise direction indicated by arrow F to allow end 64 of locking dog 62 to release from notch 35 (corresponding to the seat use locking position) in rotatable members 30, 32. The seat and seat back can then be rotated downwardly in the direction indicated by arrow C in FIGS. 5 and 8, respectively, to a seat stored position shown in FIGS. 7 and 8. In this position, end 64 of locking dog 62 extends within a locking recess 36 of rotatable members 30, 32 for locking the seat and seat back in the lowered stored position, as seen in FIGS. 2 and 7.

An arcuate slot 48 is formed in each of the fixed mounting brackets 40 to allow clearance for the ends of pivot rod 25 to accommodate such arcuate movement of the seat. Arcuate slot 48, like slot 31, is concentric with pivot axle 34 of the rotatable members 30, 32 to accommodate the motion necessary for the seat to move between the positions shown in FIGS. 1, 8 and 9 to the stored position shown in FIGS. 2, 6 and 7. An assist coil spring 38 extends between the ends of pivot axle 34 and the mounting plates 40 to assist in the raising of the seat back and seat from the stored position to the use position as described in greater detail in connection with the sequence of operation now described in connection with FIGS. 3–7.

FIGS. 3–7 are an inside view in the direction of arrow A in FIG. 1 of the rotatable member 30 and the releasable locking mechanism associated with the combined seat and seat back. The opposite side of the seat includes a mirror image locking and control mechanism 60 for the rotatable member 32 and may or may not optionally include a similar control mechanism corresponding to member 70 for the seat back. A latch mechanism corresponding to mechanism 60, however, is provided and coupled by means of cross-talk cable 54 to the left end of the seat and comprises a substantially mirror image construction to that shown in FIGS. 3–8.

Referring initially to FIG. 3 where the seat is in its lowered use position and seat back 24 is in its use position (also seen in FIG. 1), initially the cable 76 is actuated to rotate locking member 80 in a clockwise direction as shown by arrow D, which forces the end 74 of locking dog 72 to withdrawal from the locking slot 27 of plate 26 to a position shown in FIG. 4. This allows the seat 22 to be rotated upwardly in the direction indicated by arrow B in FIG. 4 to the intermediate stored position shown in FIG. 5, whereupon releasing cable 76 rotates the actuator end 80 in the direction opposite arrow D to force end 74 of locking dog 72 into a position engaging notch 28 of plate 26, as seen in FIGS. 5–7, thereby locking the seat 22 in a position immediately adjacent and substantially co-planar and parallel to seat back 24. In this position, the seat and seat back form a divided storage area for storing items behind seat back 24 and in the area previously occupied by seat 22 in front of the seat back 24.

Next, the seat back and seat are simultaneously rotated to the stored position shown in FIG. 2 by actuating cable 50 rotating cam 66 in a clockwise direction, shown by arrow F in FIGS. 5 and 8, such that the end 64 of locking dog 62 withdraws from notch 35 in both members 30 and 32 allowing the rotatable members to rotate in a clockwise direction, as indicated by arrow C in FIG. 5, through an arc defined by slots 31 and 48 such that the seat back 24 and seat 22 are substantially flush with the floor pan 18 with the lower surface 21 of seat 22 co-planar and flush with the floor 16 of the vehicle as seen in FIG. 2. Upon rotation to the lowered position, releasing cable 50 rotates cam 66 and, thus, dog 62 counterclockwise such that the end 64 of locking dog 62 engages notch 36 on the arcuate outer edge of rotatable members 30, 32, locking the seat and seat back in the stored position. The ends of cam 66 in such position engage the side of locking dog 62 opposite end 64, positively locking the rotatable members 30, 32 in the stored position. The locking dogs 62, 72 can be spring-loaded to bias them generally in the locking position while the control cables 50, 76 may also be conventionally spring-loaded to the normally locked position such that the mechanism is unlocked only by the positive operation of the cables either by pull handles, solenoids, or other motorized controls.

Thus, with the system of the present invention, a storable seat construction is provided for relative ease of operation by the vehicle operator to initially move the seat from a seating position to an intermediate stored position and subsequently the seat and seat back may be moved to a lowered position for storage utilizing a mounting and control mechanism which can be relatively easily operated and yet provide efficient positive locking and control of the seat and seat back in their movement through the various positions. It will become apparent to those skilled in the art that various modifications to the preferred embodiment of the invention as described herein can be made without departing from the spirit or scope of the invention as defined by the appended claims.

The invention claimed is:

1. A storable seat assembly comprising:
    a seat;
    a seat back;
    a pair of rotatable members and an axle for rotatably mounting each of said members in spaced relationship in a vehicle, wherein said seat is pivotally mounted to said rotatable members in offset relationship to the axis of rotation of said rotatable members and said seat back is fixedly mounted to said rotatable members such that said seat can be pivoted between a seating position remote from said seat back to a stored position adjacent said seat back; and
    said rotatable members are rotated between a first position with said seat in said stored position with a lower side of said seat in a position substantially flush with a vehicle floor and a position remote from said first position in which a seating surface of said seat is in spaced relationship above the floor of the vehicle.

2. The assembly as defined in claim 1 wherein said rotatable members are generally disk-shaped.

3. The assembly as defined in claim 1 wherein said seat includes an axle extending between said rotatable members in offset relationship to the axis of rotation of said rotatable members.

4. The assembly as defined in claim 3 and including means for rotatably mounting said rotatable members to a vehicle and a first latch extending between said mounting means and said rotatable members for selectively preventing rotation of said rotatable members.

5. The assembly as defined in claim 4 and including a second latch extending between at least one of said rotatable members and said axle of said seat for preventing rotation of said seat with respect to said rotatable members.

6. A vehicle and storable seat assembly comprising:
    a vehicle having a floor and a recessed area extending below said floor, said vehicle further including a pair of spaced-apart seat mounts on opposite sides of said floor;
    a seat platform extending substantially between said mounts, said seat platform having a seating surface and a lower surface;
    a pair of spaced rotatable members rotatably mounted to said seat mounts on an axis of rotation, wherein said seat platform is pivotally mounted to said rotatable members in offset relationship to the axis of rotation of said rotatable members such that as said rotatable members are rotated between a first position with said seat platform in said recessed area, with a lower surface of said seat platform substantially flush with said vehicle floor and a position remote from said first position in which said seating surface of said seat platform is in spaced relationship above said floor of said vehicle; and
    a seat back fixedly mounted to said rotatable members, said seat platform movable between a stored position adjacent said seat back and a use position spaced from said seat back.

7. The assembly as defined in claim 6 and a first latch extending between at least one of said seat mounts and an associated rotatable member for selectively holding said rotatable member in said first or remote positions.

8. The assembly as defined in claim 7 wherein said rotatable members are disks.

9. The assembly as defined in claim 8 wherein said seat platform comprises an axle rotatably mounted between said disks in offset relationship to the axis of rotation of said disks.

10. The assembly as defined in claim 9 and further including a second latch extending between said disks and said axle of said seat platform for selectively holding said seat platform in one of said stored and use positions.

11. A latch assembly for a storable seat which includes a seat mounted to a pair of rotatable members having an axis of rotation for rotatably mounting to a vehicle in offset relationship to the axis of rotation such that a first position, a lower side of said seat is in a position substantially flush with a vehicle floor and when rotated to a second position remote from said first position, a seating surface is presented in spaced relationship above the floor of the vehicle, said latch assembly comprising:

a frame to which at least one of said rotatable members is rotatably mounted;

a latching dog pivotally mounted to said frame, said dog having an end cooperating with notches formed in the rotatable member for selectively holding the rotatable member in said first and second positions; and a control cam selectively engaging said latching dog to move said end of said dog to an engaging position with said notches.

12. The assembly as defined in claim 11 and further including a cable release coupled to said control cam for actuating said cam.

13. The assembly as defined in claim 11 wherein said control cam is rotatably mounted to said frame and includes a surface which engages said locking dog on a side of said dog opposite said rotatable member.

14. The assembly as defined in claim 13 wherein said seat includes an axle for pivotally mounting said seat to said rotatable members and further including a second latch extending between said seat and at least one of said rotatable members for locking said seat with respect to said rotatable members.

15. The assembly as defined in claim 14 wherein said second latch comprises a plate mounted to said pivot axle of said seat and including a pair of spaced-apart notches formed in a peripheral edge thereof, and a locking member pivotally mounted to said rotatable member and including a projection for selectively engaging one of said notches.

16. The assembly as defined in claim 15 wherein said locking member is generally U-shaped and said control cam is rotatably mounted to said rotatable member and is positioned between the legs of said U-shaped locking member.

17. The assembly as defined in claim 11 wherein said frame includes a fixed guide pin in spaced relationship to the axis of rotation of said rotatable members and at least one of said rotatable members includes an arcuate slot receiving said guide pin for limiting the motion of the seat.

18. The assembly as defined in claim 11 and further including a cross cable extending from said control cam to a second control cam associated with the other of said rotating members for simultaneously actuating a second locking dog selectively engaging said other rotating member upon actuation of said cable release.

* * * * *